United States Patent
Inamura et al.

(10) Patent No.: US 9,124,208 B2
(45) Date of Patent: Sep. 1, 2015

(54) CONTROL APPARATUS FOR A POWER CONVERTER CONNECTED TO A ROTARY MACHINE WHICH IS OPERABLE AS A DRIVE MOTOR OF A VEHICLE

(71) Applicant: DENSO CORPORATION, Kariya, Aichi-pref. (JP)

(72) Inventors: Hiroshi Inamura, Kariya (JP); Hajime Uematsu, Kariya (JP); Takayuki Kakihara, Okazaki (JP)

(73) Assignee: DENSO CORPORATION, Kariya (JP)

( * ) Notice: Subject to any disclaimer, the term of this patent is extended or adjusted under 35 U.S.C. 154(b) by 253 days.

(21) Appl. No.: 13/889,738

(22) Filed: May 8, 2013

(65) Prior Publication Data
US 2013/0300332 A1 Nov. 14, 2013

(30) Foreign Application Priority Data
May 8, 2012 (JP) ................................. 2012-106509

(51) Int. Cl.
*H02P 6/08* (2006.01)
*H02P 27/06* (2006.01)
(Continued)

(52) U.S. Cl.
CPC ........... *H02P 29/0088* (2013.01); *B60L 3/0061* (2013.01); *B60L 3/06* (2013.01); *H02P 29/028* (2013.01); *B60L 2240/425* (2013.01); *Y02T 10/642* (2013.01)

(58) Field of Classification Search
CPC ........... H02P 8/36; H02P 29/00; H02P 29/02; H02K 9/00; H02K 9/19; H02K 9/20
USPC .................................................. 318/471–473
See application file for complete search history.

(56) References Cited

U.S. PATENT DOCUMENTS 6,675,597 B2 * 1/2004 Ieda et al. ........................ 62/244
7,610,954 B2 * 11/2009 Ando et al. ................... 165/202
(Continued)

FOREIGN PATENT DOCUMENTS

| JP | 2003-254110 | 9/2003 |
| JP | 2006-211886 | 8/2006 |

(Continued)

OTHER PUBLICATIONS

Office Action (3 pgs.) dated Dec. 9, 2014 issued in corresponding Japanese Application No. 2012-106509 with an at least partial English-language translation thereof (4 pgs.).

(Continued)

*Primary Examiner* — Bentsu Ro
(74) *Attorney, Agent, or Firm* — Nixon & Vanderhye PC

(57) ABSTRACT

In a vehicle, a control apparatus controls a power converter supplying a rotary machine which can operate as a drive motor of the vehicle, and controls a cooling apparatus for circulating a coolant fluid through the rotary machine and the power converter. When a temporary condition occurs immediately after commencement of the circulation, whereby the temperatures of the coolant fluid and of switching elements in the power converter are judged to concurrently exceed respective specified temperature thresholds, the control apparatus limits the maximum power that can be supplied from the power converter to a lower value than is normally available. When the temperature of the coolant fluid is judged to no longer exceed the corresponding temperature threshold, the limiting is released.

15 Claims, 5 Drawing Sheets

(51) Int. Cl.
  *B60K 11/02* (2006.01)
  *H02P 29/00* (2006.01)
  *H02P 29/02* (2006.01)
  *B60L 3/00* (2006.01)
  *B60L 3/06* (2006.01)

(56) References Cited

U.S. PATENT DOCUMENTS

| 8,151,917 | B2 * | 4/2012 | Suzuki | 180/65.275 |
| 8,583,310 | B2 * | 11/2013 | Hashimoto | 701/22 |
| 8,818,599 | B2 * | 8/2014 | Inamura | 701/22 |

| 2004/0235613 | A1 | 11/2004 | Aoki et al. |
| 2007/0290650 | A1 | 12/2007 | Muta |
| 2013/0151051 | A1 | 6/2013 | Inamura |

FOREIGN PATENT DOCUMENTS

| JP | 2010-068641 | 3/2010 |
| JP | 2013-121233 | 6/2013 |

OTHER PUBLICATIONS

Office Action (3 pages) dated Apr. 1, 2014, issued in corresponding Japanese Application No. 2012-106509 and English translation (5 pages).

\* cited by examiner

CONTROL APPARATUS FOR A POWER CONVERTER CONNECTED TO A ROTARY MACHINE WHICH IS OPERABLE AS A DRIVE MOTOR OF A VEHICLE

CROSS-REFERENCE TO RELATED APPLICATIONS

This application is based on and incorporates herein by reference Japanese Patent Application No. 2012-106509 filed on May 8, 2012

BACKGROUND OF THE INVENTION

1. Field of Application

The present invention relates to a control apparatus for controlling a power converter which incorporates switching elements and is connected to a rotary machine operable as a drive motor of a vehicle, and for controlling a cooling apparatus to effect cooling of the rotary machine and the switching elements of the power converter. In particular, the invention relates to a control apparatus for a system in which the cooling apparatus circulates a coolant fluid via a path through the rotary machine and the power converter.

2. Background Technology

Types of control apparatus are known for controlling a rotary machine such as a motor/generator which is installed in a vehicle and serves as a drive motor for the vehicle when operated as an electric motor. Such a control apparatus includes a power converter incorporating switching elements, which is electrically connected for supplying/receiving power to/from the rotary machine, and a cooling apparatus for cooling the rotary machine and the power converter, preventing excessive temperature increase of the switching elements. The cooling apparatus may effect the cooling by circulation of a coolant fluid via a path through the rotary machine and the power converter. Other methods of preventing excessive temperature rise of the switching elements in such a system have been proposed. A control apparatus is described in Japanese patent first publication No. 2006-211886 (referred to in the following as reference 1) for example, for application to a 3-phase AC synchronous electric motor which functions as the drive motor of a vehicle. A DC supply voltage is converted to a 3-phase AC supply voltage by on/off switching at a high switching frequency (carrier frequency) by the switching elements, with the switching being modulated for controlling the AC supply frequency (i.e., controlling the motor speed). The switching is further modulated for controlling the level of electrical power supplied from the inverter (thereby determining the level of current passed by the switching elements) in accordance with a command value of torque expressing a torque demand. With the system described in reference 1, the switching frequency is increased in successive steps, for successively increasing ranges of motor speed. For each switching frequency, a predetermined relationship is established between the detected temperature of the switching elements and allowed maximum values of the torque demand, as illustrated in FIG. 3 of reference 1 (showing values of switching element temperature and of torque demand along the horizontal and vertical axes respectively). The relationship is such that the maximum permitted value of the torque demand becomes increasingly limited (is progressively reduced below 100%) as the detected switching element temperature increases. The maximum level of supplied AC power is limited accordingly. The switching elements can thereby be prevented from reaching an excessively high temperature due to heating caused by switching losses.

However with such a technique, the effects of limiting the torque developed by the motor when providing motive power to a vehicle may present problems. Specifically, when the maximum available torque is limited to a relatively low value, torque restriction may be frequently applied, for periods of long duration. Hence the effective level of torque may be insufficient and the user may have feelings of unease.

SUMMARY

Hence it is desired to overcome the above problem, by providing a control apparatus which controls a rotary machine operable as the drive motor of a vehicle, and which controls a cooling apparatus for cooling the rotary machine and cooling switching elements of a power converter which is connected to the rotary machine, whereby the control apparatus effectively protects against excessive temperature increase of the switching elements, but whereby it can be ensured that sufficient torque will be produced by the rotary machine when operated to provide motive power to the vehicle.

In the following, the term "drive motor" of a vehicle signifies a rotary machine when operated as an electric motor which provides motive power for driving the vehicle, i.e., with torque produced by the rotary machine being transmitted to the drive wheels of the vehicle. The rotary machine may be the exclusive drive motor of the vehicle, or an internal combustion engine or the rotary machine (or both of these concurrently) may be selectable for driving the vehicle, i.e., the rotary machine may generate all or part of the total amount of torque required to drive the vehicle.

The cooling apparatus is controlled to circulate a coolant fluid via a circulation path passing through the rotary machine and through the power converter. The control apparatus acquires respective values of temperature of the coolant fluid and the switching elements, from temperature sensors, etc. The control apparatus is characterized by incorporating processing circuitry which executes a first comparison operation to compare the temperature of the coolant fluid with a first temperature threshold, and a second comparison operation to compare the detected temperature of the switching elements with a second temperature threshold, which is higher than the first temperature threshold and no higher than a maximum allowable temperature of the switching elements. Based on the results of these comparisons, the processing circuitry selects one of two control processing operations to be executed. These consist of processing for limiting the maximum level of power supplied to the rotary machine, and processing for releasing the limiting when it is being applied.

The processing circuitry is preferably configured to execute processing for applying the limiting when the temperature of the coolant fluid is judged to exceed the first temperature threshold and also (concurrently) the temperature of the switching elements is judged to exceed the second temperature threshold. The limiting serves to restricts the maximum supplied power from the power converter to a value whereby the temperature of the switching elements will not rise excessively during a startup condition of the power converter immediately after the vehicle is started. Such processing circuitry is further preferably configured to release the limiting if it is detected that the temperature of the coolant fluid has become no higher than the first temperature threshold (i.e., irrespective of the acquired temperature value of the switching elements), and to inhibit application of the limiting so long as it is detected that the temperature of the coolant fluid is no higher than the first temperature threshold.

Alternatively, the processing circuitry may be configured to release the limiting if it is detected that the temperature of the coolant fluid has become no higher than the first temperature threshold and/or that the temperature of the switching elements has become no higher than the second temperature threshold.

If the startup condition occurs, it can be expected to continue for only a short interval (startup interval), commencing when circulation of the electrical apparatus coolant fluid is commenced. Thus the limiting will not generally be applied during normal running of the vehicle when driven by the rotary machine (or by the rotary machine in conjunction with an internal combustion engine), with higher (unrestricted, or less restricted) maximum levels of electrical power being generally available during normal running. Here, "normal running" signifies running the vehicle in a condition other than immediately after starting the vehicle. The problem of repetitive restriction of available torque during normal running, and of insufficient available torque, can thereby be substantially avoided.

The processing circuitry may be configured to unconditionally release the limiting, if the limiting becomes applied immediately after commencement of the circulation of the coolant fluid, when a predetermined time interval has elapsed following that commencement.

In the case of a system in which the level of power supplied to the rotary machine is determined by the control apparatus based on a command value of torque, the limiting of the maximum level of supplied power from the power converter can be effected by appropriately limiting the torque command value, as described in the following with reference to specific embodiments.

DESCRIPTION OF PREFERRED EMBODIMENTS

Figure 1:
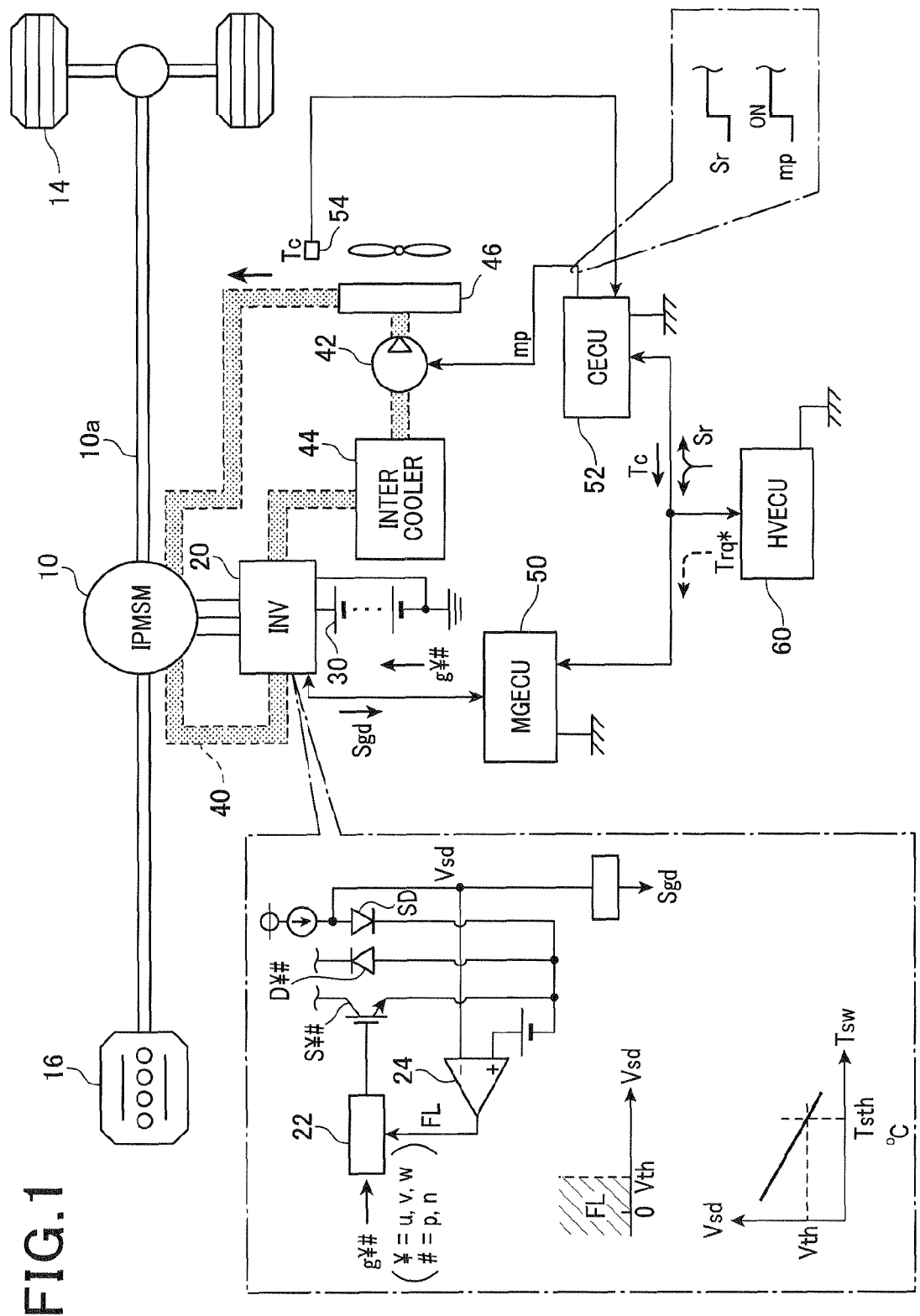
FIG. 1 shows the general configuration of a vehicle system incorporating a first embodiment of a control apparatus for a rotary machine of a vehicle.

A first embodiment of a control apparatus for a rotary machine will be described referring to FIG. 1, showing the general configuration of a vehicle control system of a parallel-hybrid type of vehicle, incorporating the embodiment. In FIG. 1, a 3-phase motor-generator 10 is operable as a drive motor of the vehicle. A drive shaft 10a of the motor-generator 10 is coupled to the drive wheels 14 of the vehicle via a transmission, etc. (not shown in the drawings). The drive shaft 10a is also coupled to the output shaft (crankshaft) of an internal combustion engine 16 via a clutch, etc. (not shown in the drawings). With this embodiment, the motor-generator 10 is an IPMSM (interior permanent magnet synchronous motor).

The motor-generator 10 is connected via an inverter 20 (DC-to-AC power converter) to a high-voltage battery 30, having a nominal terminal voltage of 100 V or higher, for example. The inverter 20 incorporates switching elements SYp (Y=u, v, w) which are connected to the positive terminal of the high-voltage battery 30 and to respective terminals of the motor-generator 10 (a 3-phase rotary machine), and switching elements SYn connected to the negative terminal of the high-voltage battery 30 and to respective terminals of the motor-generator 10. Designating the switching elements collectively as SY# (#=p, n), these consist of IGBTs (insulated-gate bipolar transistors), with respective diodes DY# being connected in reverse polarity across each of the switching elements SY#, as illustrated in FIG. 1.

In the inverter 20, a drive circuit 22 is connected to the control electrode (gate) of each of the switching elements SY#, and receives externally supplied 3-phase voltage signals (designated as the operating signals gY#) as on/off operation commands for the switching elements SY#. The drive circuit 22 thereby applies respective drive signals to the gates of the switching elements SY#, to control ON/OFF switching of these.

A temperature sensing diode Sd is disposed close to the switching elements SY# for detecting the temperature of the switching elements SY# and diodes DY#. The output voltage Vsd from the temperature sensing diode Sd is supplied as a temperature detection signal to the inverting input terminal of a comparator 24, while a threshold voltage Vth is applied to the non-inverting input terminal of the comparator 24. The threshold voltage Vth is set as the value of the output voltage Vsd of the diode Sd which corresponds to a predetermined threshold temperature Tsth of the switching elements SY# and diodes DY#. The output voltage Vsd of the diode Sd has a negative correlation with temperature variation. When the voltage Vsd exceeds the threshold value Vth, indicating that the temperature of the switching elements SY# and diodes DY# exceeds the threshold value Tsth, a fail signal FL is outputted from the comparator 24 to the drive circuit 22, causing the drive circuit 22 to forcibly switch each of the switching elements SY# to the OFF state. The switching elements SY# are thereby set in the OFF state if the temperature of the switching elements SY# and diodes DY# becomes excessively high.

The coolant fluid 40 (an incompressible fluid) serves to cool the motor-generator 10 and the inverter 20. Unless otherwise indicated, the term "coolant fluid" as used in this description and in the appended claims signifies an electrical apparatus coolant fluid (as distinct from a coolant fluid of the engine 16). The cooling apparatus incorporates a pump 42, an intercooler 44 and a radiator 46. The pump 42 circulates the coolant fluid 40 in a path through the radiator 46, the motor-generator 10, the inverter 20 and the intercooler 44, thereby cooling the motor-generator 10 and the switching elements of the inverter 20. The cooling apparatus is configured such that when the coolant fluid 40 is circulating normally (i.e., other than immediately after the circulation has commenced) the temperature of the switching elements SY# of the inverter 20 will not exceed a maximum permissible limit value. That temperature limit (for example 150° C.) is lower than the threshold value Tsth and is predetermined such as to maintain the reliability of the switching elements SY# and the diodes DY#.

The inverter 20 is controlled by a MGECU 50, which thereby controls the motor-generator 10. The MGECU 50 is an electronic control unit incorporating a microcomputer having a CPU, memory, etc., with the CPU executing processing in accordance with a program stored in the memory, and with control and judgement operations performed by the MGECU 50 being determined by the processing contents.

The MGECU 50 generates the three-phase drive signals gY# which are supplied to the inverter 20, for controlling the operation of the inverter 20 in accordance with a command value of torque Trq*. The MGECU 50 receives the temperature detection values from the temperature sensing diode SD, after conversion to a digital signal Sgd. More specifically, the output voltage signal Vsd from the temperature sensing diode SD is subjected to PWM (pulse width modulation) processing, and the resultant digital signal is supplied to the MGECU 50 via an electrically isolating communication device such as a photocoupler.

The pump 42 is operated by a CECU 52 (an electronic control unit) which thereby controls the flow of coolant fluid 40. The CECU 52 receives the detected value of temperature Tc of the coolant fluid 40, supplied from a temperature sensor 54. Based on that temperature value, the CECU 52 produces a drive signal mp which controls the pump 42. With this embodiment, the temperature sensor 54 is located at a position in the flow path of the coolant fluid 40 downstream from the radiator 46 and upstream from the motor-generator 10. The CECU 52 also supplies the detection value Tc from the temperature sensor 54 to the MGECU 50.

The HVECU 60 is an electronic control unit which enables communication with the man-machine interface, i.e., with running enabling switches, accelerator actuation members and accelerator sensor, instrument panel, etc., (not shown in the drawings). The HVECU 60 incorporates a microcomputer having a CPU, memory, etc., with the CPU executing processing in accordance with a program stored in the memory. With this embodiment, the electrical system reference (ground) voltage which is utilized by the MGECU 50, the HVECU 60 and the CECU 52 is the vehicle chassis potential. A potential midway between the positive and negative potentials of the high-voltage battery 30 is set at the vehicle chassis potential, i.e., the reference (ground) potential of the high-voltage battery 30 (as utilized in the inverter 20) differs from the chassis potential.

The running enabling switches are switches which can be set to the on state to indicate an intention of the user to begin driving the vehicle. These can consist of switches that can be directly actuated by the user, and switches which can be remotely actuated when a portable device (carried by the user) is brought close to the vehicle. When a running enabling switch is set to the ON state, the HVECU 60 outputs a ready signal Sr to the MGECU 50 and the CECU 52. The CECU 52 is triggered by the signal Sr to begin to drive the pump 42. When the signal Sr is received by the MGECU 50, it commences controlling the level of power supplied from the inverter 20 to the motor-generator 10 in accordance with the torque command value Trq* supplied from the HVECU 60.

The engine 16 is controlled by an engine electronic control unit (not shown in the drawings) which is separate from the HVECU 60 and the MGECU 50. The level of torque currently required to be supplied by the motor-generator 10 for driving the vehicle is determined by the HVECU 60 based on signals from sensors (not shown in the drawings) providing information such as the degree to which the user is actuating the accelerator pedal of the vehicle, etc., and information from the engine ECU indicating the level of torque that can currently be provided by the engine. The HVECU 60 thereby calculates the torque command value Trq* as the amount of torque to be produced by the motor-generator 10. Specifically, the motor-generator 10 is controlled such that the total of the respective values of torque produced by the engine 16 and the motor-generator 10 is equal to the amount currently required for driving the vehicle.

The processing executed by the MGECU 50 relating to control applying torque limiting to the motor-generator 10 (will be described in the following. "Applying torque limiting" as used here, signifies restricting the maximum value of an actual torque command (i.e., a value of torque demand that is used by the MGECU 50 as a basis for controlling the level of power supplied by the inverter 20). Such torque limiting is applied when a specific abnormal temperature condition of the coolant fluid 40 and the switching element SY# is judged to be occurring, as described in the following.

With the present invention, the temperature of the coolant fluid 40 is taken into consideration when applying torque limiting. Specifically, a first temperature threshold Tα is predetermined as being the maximum temperature expected to be reached by the coolant fluid 40 when circulating normally (i.e., other than immediately after commencement of the circulation). A suitable value for Tα (for example 65° C.) can be determined based on tests performed beforehand.

The torque limiting processing enables the overall size and cost of the cooling apparatus to be reduced. There are two main reasons for this.

Firstly, immediately after circulation of the coolant fluid 40 has commenced, the temperature of a part of the coolant fluid 40 may become excessively high. Specifically, the temperature of that part of the coolant fluid 40 which is close to the inverter 20 may become higher than the maximum temperature that will be attained by the coolant fluid 40 when it is circulating normally. The high temperature can be caused for example if the vehicle is restarted soon after becoming halted, with the motor-generator 10 having been operating under a high load at the time of halting. In that case, immediately after the vehicle is restarted and circulation of the coolant 40 commences, heat produced from the motor-generator 10 will raise the temperature of the coolant fluid 40. When the high-temperature coolant fluid 40 then flows through the inverter 20, the temperature of the switching elements SY# in the inverter 20 becomes increased accordingly.

If the level of current flowing in the motor-generator 10 at that time is high, the temperature of the switching elements SY# may exceed the upper allowable temperature limit of these elements, due to heat generated by switching losses in the switching elements.

This can be prevented for example by measures such as increasing the maximum discharge rate of the pump 42, or by increasing the surface area of thermal radiation section of the radiator 46, etc., and thereby enhancing the heat dissipation performance of the cooling apparatus. However such measures will result in increased overall size and/or cost of the apparatus.

Alternatively, the problem could be avoided by arranging that circulation of the coolant fluid 40 is continued during a fixed-duration interval after the vehicle becomes halted. However this would present problems of increased electrical power consumption, etc., and the continued operation of the coolant fluid pump could cause feelings of unease in the user.

The second advantage obtained by the torque limiting processing is as follows. The actual maximum temperature attained by the coolant fluid 40 may exceed an expected maximum value which was determined when the overall vehicle control system (including the cooling apparatus) was designed and developed. As a result, when the level of current flowing in the motor-generator 10 becomes high, there is a danger that the temperature of the switching elements SY# may exceed the upper allowable temperature. This may be caused by the temperature of the environment in which the vehicle control system is actually operating becoming higher than a maximum temperature value which was assumed when the vehicle control apparatus was being designed and developed. Such high environmental temperatures may be caused by future climate variations, etc, or by some special environmental condition which was not anticipated when the vehicle control system was designed and developed.

It might be imagined that such problems could be avoided by designing the cooling apparatus to have a higher thermal dissipation performance, when the vehicle control system is designed and developed, i.e., such that the cooling apparatus can cope with potentially higher values of environmental operating temperature in future, due to climate change, etc. However this is undesirable, since it would result in increased size and/or cost of the cooling apparatus.

The torque limiting processing of this embodiment serves to avoid such problems.

If the torque limiting were to be applied indiscriminately each time the temperature of the coolant fluid 40 exceeds the first temperature threshold, there would be a danger of increased fuel consumption by the vehicle. This is due to the fact that if the torque limiting is performed frequently, the frequency of the periods during which the vehicle is driven by the engine alone would become increased.

Hence with this embodiment, the torque limiting is applied by the MGECU 50 based upon both the temperature of the coolant fluid 40 and of the switching elements SY#, i.e., is applied only when acquired temperature values of the coolant fluid 40 and the of switching elements SY# exceed respective temperature thresholds. This is a condition which is expected to be only possible immediately after circulation of the coolant fluid has commenced. As a result, while ensuring that the switching elements SY# are protected against excessive temperature increase, it can also be ensured that torque limiting is not repetitively applied during normal running of the vehicle.

Figure 2:
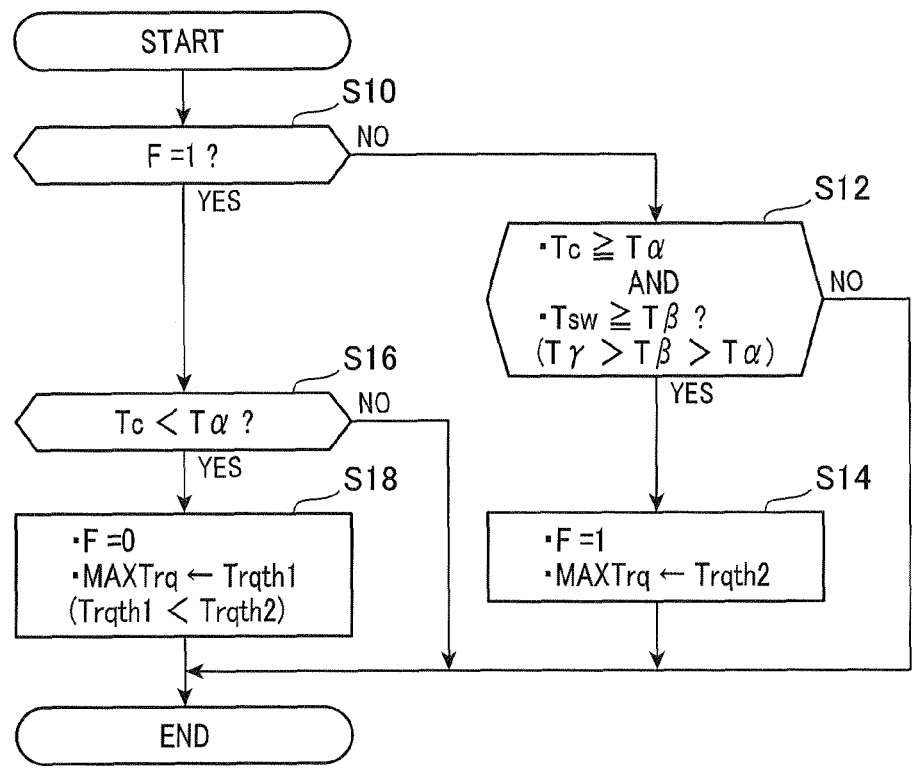
FIG. 2 is a flow diagram of torque limiting processing that is executed by the first embodiment.

FIG. 2 is a flow diagram of a torque limiting processing sequence which is repetitively executed by the MGECU 50 of this embodiment after the ready signal Sr has become switched to the ON state.

Firstly in step S10 of FIG. 2, a decision is made as to whether a flag F is set to 1, indicating that the maximum value of the torque command value is restricted to a first (relatively low) limit value Trqth2, referred to as the startup value. If F is set to 1, step S16 is then executed, while otherwise, step S12 is then executed.

In step S12, a decision is made (based on the detection signal produced by the temperature sensor 54) as to whether the acquired temperature Tc of the coolant fluid 40 is above the first temperature threshold Tα, as a first condition, and whether the acquired temperature Tsw of the switching elements SY# (as judged based on the temperature detection signal Sgd) is above a second temperature threshold Tβ, as a second condition. If both of the first and second conditions are satisfied, a YES decision is reached in step S12. This processing serves to judge whether the torque command value Trq* is to be restricted to the startup value Trqth2.

The second temperature threshold Tβ is set higher than the first temperature threshold Tα, while being lower than the maximum allowable limit temperature Tγ of the switching elements SY#. The second specified temperature threshold Tβ (e.g., 135° C.) is determined by subtracting a temperature detection error (amount of difference from the actual temperature of the switching elements SY#) from the upper allowable limit temperature Tγ. For example if the temperature detection error range were known to be ±15° C., 15° C. would be subtracted from Tγ. Such a temperature detection error can result from a fixed error of the output characteristic of the temperature sensing diode SD, quantization error of the temperature information, etc.

If it is judged that the temperature Tc of the coolant fluid 40 is less than the first temperature threshold Tα, then irrespective of the temperature Tsw of the switching elements SY# (NO decision in step S12), the processing is ended without applying the startup value Trqth2. If a YES decision is reached in step S12, step S14 is then executed to set the flag F to 1, and a torque guard value MAXTrq is set to the startup value Trqth2. The MGECU 50 determines the level of power supplied from the inverter 20 to the rotary machine 10 based on a torque command value that is obtained by limiting the torque command value Trq* (supplied from the HVECU 60) by the torque guard value MAXTrq.

Figure 3:
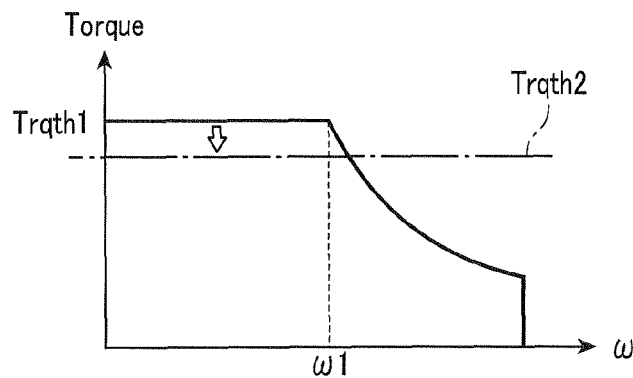
FIG. 3 shows a graph for illustrating torque limiting applied by the present invention.

FIG. 3 shows the relationship between torque produced by the motor-generator 10 and the electrical angular velocity ω of the motor-generator 10 for this embodiment. As shown in FIG. 3, the startup value Trqth2 of the guard value MAXTrq is less than the normal-state value Trqth1, which is applied so long as the combination of temperature conditions [Tc≥Tα while Tsw≥Tβ] does not occur.

Thus the torque command value utilized by the MGECU 50 in controlling the rotary machine 10 by the inverter 20 is limited to a maximum of Trqth1 during normal running and becomes restricted to the startup torque limit Trqth2 only if the temperatures of both the coolant fluid 40 and the switching elements SY# are judged to exceed their respective threshold values Tα and Tβ concurrently.

When the torque command value is restricted to the startup value Trqth2, the maximum level of power that can be supplied to the motor-generator 10 is correspondingly restricted to a lower value than when the normal-state value Trqth1 is applied, i.e., the maximum level of current which can flow in the switching elements SY# and diodes DY# of the inverter 20 is reduced. As a result, conduction losses in the inverter 20 can be reduced during the startup interval (interval in which the startup value Trqth2 is applied), so that the heat generated by these losses is reduced.

As shown in FIG. 3, when the electrical angular velocity ω of the motor-generator 10 is below a specific value (e.g., ω1 in FIG. 3) the maximum attainable torque remains fixed (as Trqth1 or Trqth2) while as ω increases above that specific value the maximum attainable torque becomes decreased accordingly. This is due to the fact that with a specific DC supply voltage of the inverter 20, as ω increases, the level of induced voltage of the motor-generator 10 increases accordingly, thus decreasing the maximum torque that can be attained using the value of DC supply voltage of the inverter 20.

In the above description, the torque guard value MAXTrq is set as a fixed value, either Trqth1 or Trqth2. However it would also be possible to make Trqth1 and Trqth2 (or one of these) vary in accordance with the electrical angular velocity ω in a predetermined manner. Specifically, it would be possible to use a first memory map which relates startup values Trqth1 to values of ω, and a second memory map which relates normal-state values Trqth2 to values of ω. Torque limit values read out from such a map could then be applied as described above for the fixed value of Trqth1 and Trqth2.

Returning to FIG. 2, if a YES decision is made in step S10, it is judged that the torque guard value MAXTrq is currently restricted to the startup value Trqth2, and step S16 is then executed to judge whether the temperature Tc of the coolant fluid 40 is lower than the first temperature threshold Tα. This processing is performed to determine whether the conditions for halting the limiting of the torque command value Trq* to the startup value Trqth2 are satisfied. Specifically, the value of the temperature threshold Tα is predetermined such that, if the temperature of the coolant fluid 40 is lower than Tα, there is only a low probability that the actual temperature of the switching elements SY# at that time (as opposed to the acquired temperature value Tsw) exceeds the upper allowable temperature limit for the switching elements. As described above, a suitable value for Tα (i.e., which is appropriate for a specific vehicle control system) can be predetermined based on results of tests.

If a YES decision is made in S16, step S18 is then executed, in which the flag F is initialized to 0, and the torque guard value MAXTrq is set as the normal-state value Trqth1.

If a NO decision is reached in step S12 or step S16, or if either of steps S14 or S18 is completed, execution of the processing sequence is ended.

This embodiment provides the following effects.

(1) The actual torque command value is restricted to the (relatively low) startup value Trqth2 only if it is judged that the temperature Tc of the coolant fluid 40 exceeds the first temperature threshold Tα while also the temperature Tsw of the switching elements SY# exceeds the second temperature threshold Tβ. Thus with this embodiment, even if it is judged that the temperature of the switching elements SY# exceeds the second temperature threshold Tβ, the torque guard value MAXTrq* is not set to the startup value Trqth2 unless it also is judged that the temperature Tc of the coolant fluid 40 is higher than the first temperature threshold Tα. In the prior art however, such restriction for the purpose of temperature protection of the switching elements is applied based only on the temperature of the switching elements.

Hence with this embodiment, for a specific overall scale and cost of the cooling apparatus, the maximum level of torque allowed to be produced by the motor-generator 10 during normal running of the vehicle can be made higher than is possible in the prior art. Thus, frequent occurrences of torque restriction during normal running of the vehicle can be prevented.

Furthermore when the available torque from such a motor-generator of a vehicle becomes reduced due to torque restriction being applied, additional power (for additional torque) must be provided from the vehicle engine. Thus the embodiment enables lower fuel consumption and hence lower operating costs for the vehicle, while improving the driveability of the vehicle.

With the above-described torque limiting processing, it can be expected that the torque guard value MAXTrq* will be set to the startup value Trqth2 during the startup interval, and only if specific high-temperature conditions of both the coolant fluid and the switching elements are detected at that time. As described above, the startup interval commences when the circulation of the coolant fluid 40 begins, and continues only until the temperature of the coolant fluid 40 has stabilized (e.g., until a YES decision is reached in step S12 or S16 of FIG. 2 above). Thus the torque limiting does not significantly affect the driveability of the vehicle, since the startup interval can have only a short (or zero) duration, and a very high level of torque is unlikely to be required from the motor-generator 10 during that interval.

(2) If it is judged that the temperature Tc of the coolant fluid 40 is less than the first temperature threshold Tα, the torque limiting in accordance with Trqth2 is released (the torque guard value MAXTrq* becomes set to Trqth1) irrespective of the acquired temperature value Tsw of the switching elements SY#. As a result, the opportunities for releasing the torque limiting based on Trqth2 are increased, thereby minimizing the duration for which the torque command value can be limited to the startup value Trqth2.

(3) Even if it is judged that the temperature Tsw of the switching elements SY# has exceeded the second temperature threshold Tβ, when torque limiting based on the startup value Trqth2 is not currently being applied, application of torque limiting based on Trqth2 is inhibited if it is judged that the temperature Tc of the coolant fluid 40 is less than the first temperature threshold Tα (e.g., so that a NO decision is reached in step S12 of FIG. 2). As a result, there is a reduced probability that the torque guard value MAXTrq* will be set to the startup value Trqth2, i.e., the frequency of applying that torque limiting can be reduced.

Second Embodiment

A second embodiment will be described, with the description centered on points of difference from the first embodiment. With the second embodiment, the conditions for releasing torque limiting based on the startup value Trqth2 (i.e., changing the torque guard value MAXTrq* to the normal-state value Trqth1) are altered.

Figure 4:
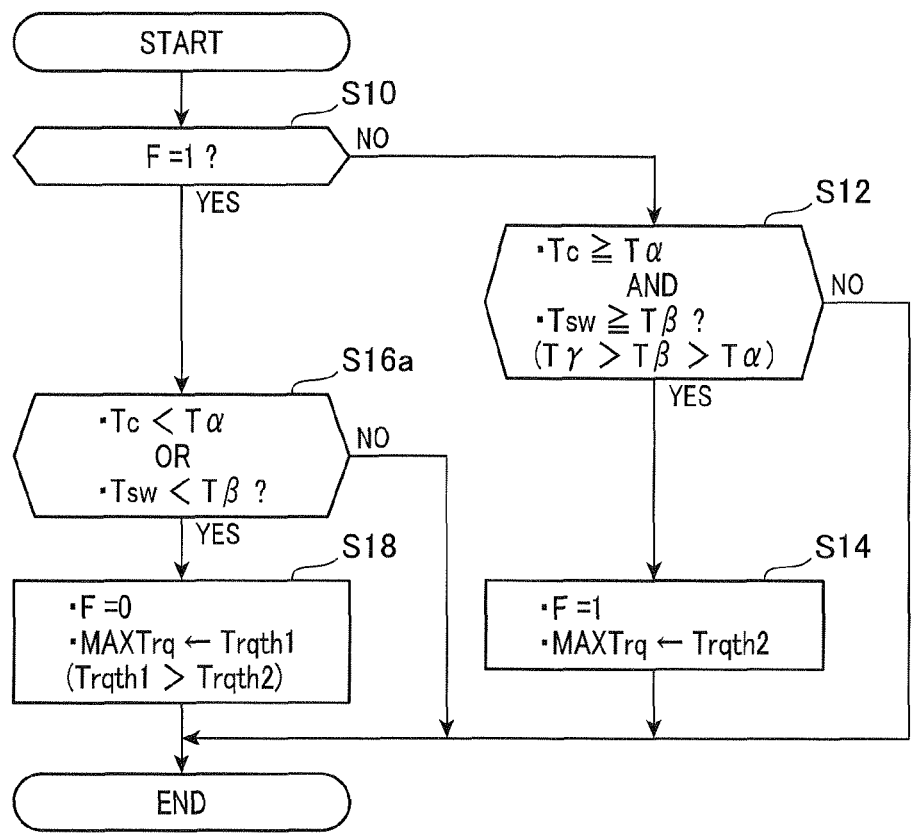
FIG. 4 is a flow diagram of torque limiting processing that is executed by a second embodiment.

FIG. 4 is a flow diagram of a torque limiting processing sequence repetitively executed by the MGECU 50 of the second embodiment. In FIG. 4, processing contents corresponding to contents shown in FIG. 2 above are indicated by corresponding reference numerals to those of FIG. 2.

In this processing sequence, firstly if a YES decision is made in step S10 (indicating that torque limiting based on the startup value Trqth2 is currently being applied) step S16*a* is then executed. In step S16*a* a decision is made as to whether the condition that the temperature Tc has reached the first temperature threshold Tα, or the condition that the temperature Tsw has reached the second temperature threshold Tβ (or both of these condition) is satisfied. This serves to judge whether the conditions for releasing limiting of the torque command value Trq* based on Trqth2 are met. If a YES decision is reached in step S16*a*, step S18 is then executed, to change the torque guard value MAXTrq* from the startup value Trqth2 to the normal-state value Trqth1. Otherwise (NO decision in step S16*a*) the processing sequence is ended, with the torque guard value MAXTrq* remaining at the startup value Trqth2.

With this embodiment, as for the first embodiment, it can be ensured that if torque limiting in accordance with the startup value Trqth2 becomes applied after circulation of the coolant fluid 40 is commenced, that restriction will be released (the torque guard value MAXTrq* will become set to the normal-state value Trqth1) only when there is no danger of the temperature of the switching elements SY# becoming excessively high.

Third Embodiment

A third embodiment will be described, with the description centered on points of difference from the first embodiment. With this embodiment, the torque guard value MAXTrq* becomes set to the startup value Trqth2 immediately when circulation of the coolant fluid 40 is commenced. MAXTrq* then remains at remains at Trqth2 for no longer than a fixed-duration startup interval, then becomes set to the normal-state value Trqth1. However MAXTrq* is set to the normal-state value Trqth1 before the startup interval has elapsed, if it is detected that the temperature Tc of the coolant fluid 40 is less than the temperature threshold Tα, and/or that the temperature Tsw of the switching elements is less than the temperature threshold Tβ.

Figure 5:
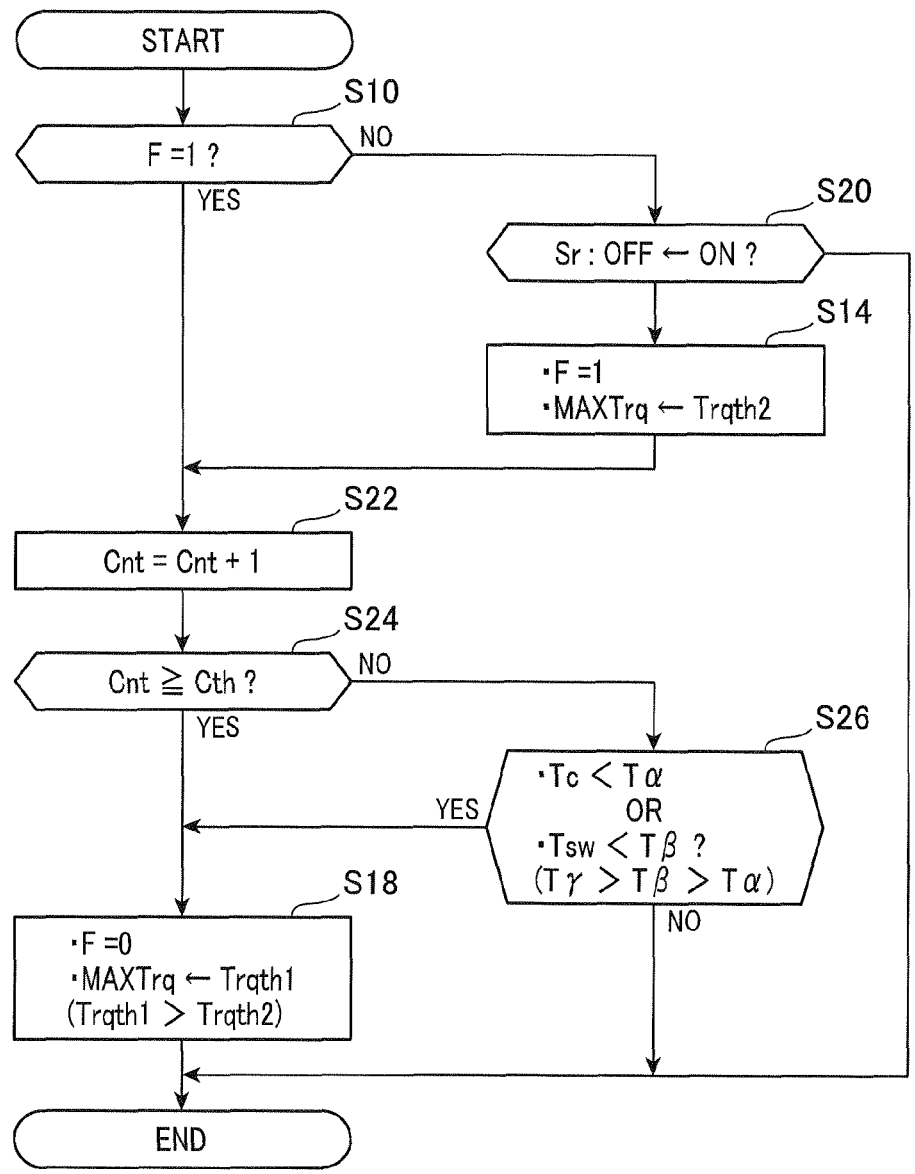
FIG. 5 is a flow diagram of torque limiting processing that is executed by a third embodiment.

FIG. 5 is a flow diagram of the torque limiting processing of the third embodiment, repetitively executed by the MGECU 50 at fixed intervals. In FIG. 5, processing contents corresponding to contents shown in FIG. 2 above are indicated by corresponding reference numerals to those of FIG. 2.

Firstly in step S10, if it is judged that the flag F is not in the 1 state (MAXTrq* is not currently set to Trqth2), step S20 is then executed to judge whether the ready signal Sr has now become switched from the off to the on state, i.e., to judge whether (since the preceding execution of this processing routine) the circulation of the coolant fluid 40 has been commenced. If so (YES decision), step S14 is then executed to set the torque command value MAXTrq to the startup value Trqth2.

If there is a YES decision reached in step S10 (indicating that the torque command value MAXTrq is currently set to the startup value Trqth2) or if the processing of step S14 is completed, step S22 is then executed to increment a count Cnt by 1.

Following step S22, in step S24, a decision is made as to whether Cnt has reached a threshold value Cth. If Cth has been reached, this indicates that torque limiting to the startup value Trqth2 is to be released. The time required for Cnt to attain Cth, after circulation of the coolant fluid 40 has commenced, defines a fixed-duration startup interval. That duration is predetermined such that the temperature of the switching elements SY# and the diodes DY# will not exceed the allowable upper limit value TY even if the torque command value MAXTrq becomes changed from the startup value Trqth2 to the normal-state value Trqth1 unconditionally when Cnt reaches the value Cth.

The startup interval duration should be made less than 15 seconds and at least 3 seconds, and is preferably between 10 seconds and 5 seconds.

If there is a NO decision in step S24, operation then proceeds to step S26. In step S26 a decision is made as to whether at least one of two conditions is satisfied, i.e., a condition that the temperature Tc of the coolant fluid 40 is less than the temperature threshold Tα or a condition that the temperature Tsw of the switching elements is less than the temperature threshold Tβ.

If there is a YES decision in step S24 or step S26, step S18 is then executed to release the limiting of the torque command value to the startup value Trqth2, by resetting the flag F to 0 and setting the torque guard value MAXTrq as the normal-state value Trqth1. If there is a NO decision in step S20 or step S26, or the processing of step S18 has been performed, this execution of the processing routine is ended.

Figure 6:
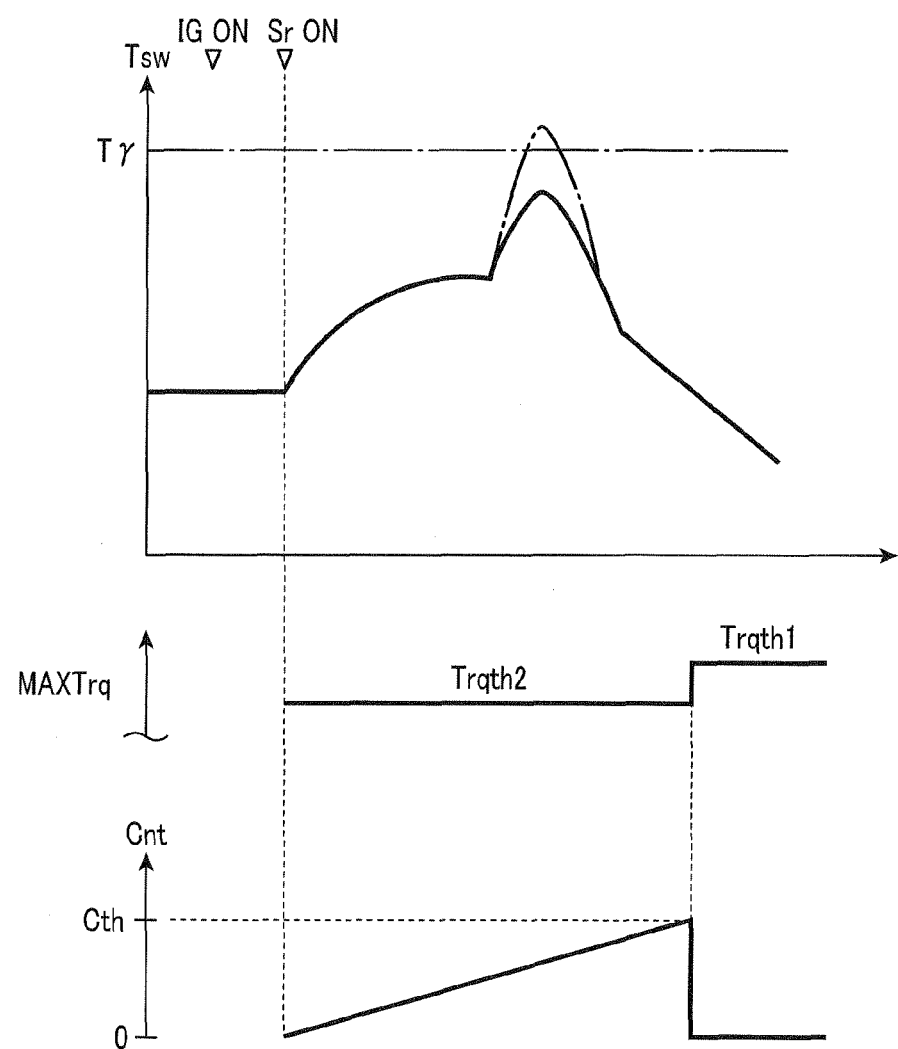
FIG. 6 is a diagram for illustrating effects obtained by the third embodiment.

FIG. 6 illustrates the effects of this embodiment. As shown, when the ignition switch of the vehicle is set on (indicated as IG ON), the ready signal Sr is set to the on state, to commence circulation of the coolant fluid 40. As a result the coolant fluid 40 which is close to the motor-generator 10 and thereby becomes heated will transfer heat to the switching elements SY# and the diodes DY#, causing the temperature of these to rise. The degree of heating may cause the torque guard value MAXTrq to become set at the startup value Trqth2. In that case, the maximum value of electrical power supplied to the inverter 20 (hence, maximum level of current that is passed by the switching elements SY#) is thereby restricted in accordance with Trqth2 as a maximum command value of torque. Trqth2 is predetermined such that excessive temperature increase of the switching elements SY# and the diodes DY# will not occur in this condition.

Thus as illustrated by the full-line portion of the characteristic shown in the diagram, the temperature Tsw of the switching elements SY# does not reach the allowable upper limit temperature TY. On the other hand if the torque command value applied by the MGECU 50 were to be limited to the normal-state value Trqth1 when circulation of the coolant fluid 40 begins, then as illustrated by the chain-line portion of the characteristic, the temperature Tsw could exceed the maximum allowable limit TY.

The torque limiting processing of the third embodiment thereby ensures that sufficient protection for the switching elements of the inverter 20 is provided by the cooling apparatus during normal running of the vehicle while enabling a higher maximum level of torque to be provided during normal running than is possible with the prior art, without increasing the scale of the cooling apparatus. However it is also ensured that the temperature of the switching elements SY# and diodes DY# cannot rise excessively during the startup interval immediately after the vehicle is started and circulation of the coolant fluid 40 commences.

Furthermore with the processing of step S26 shown in FIG. 5, when torque limiting to the startup value Trqth2 is being applied, the limiting will be changed to be in accordance with the normal-state value Trqth1 if it is judged that the acquired temperature Tsw of the switching elements SY# is less than the second temperature threshold Tβ, even if the acquired temperature of the coolant fluid 40 exceeds the first temperature threshold Tα. Thus, the torque limiting based on Trqth2 can be released after only a very short time has elapsed following commencement of circulation of the coolant fluid 40.

With the above embodiments, the MGECU 50 executes the functions of a control apparatus as recited in the claims. The inverter 20 corresponds to a power converter and the motor-generator (IPMSM) 10 corresponds to a rotary machine as recited in the claims.

As can be understood from the above, the present invention has the following basic features. In a system in which a cooling apparatus circulates a coolant fluid for cooling a rotary machine which is operated as an electric motor and also for cooling the switching elements of a power converter which supplies electrical power to operate the rotary machine (i.e., with the coolant flowing in a path which passes through each of the power converter and the rotary machine), the respective temperature values of the coolant fluid and of the switching elements are acquired and evaluated by a control apparatus. If the combination of acquired temperature values of the coolant fluid and the switching elements corresponds to a specific (abnormal) startup condition, the control apparatus restricts the power supplied to the power converter. The supplied power is limited to a maximum value which is lower than can be supplied during normal operation of the rotary machine.

The startup condition is that the temperature of the coolant fluid exceeds a first temperature threshold while, concurrently, the temperature of the switching elements exceeds a second temperature threshold. The second temperature threshold is made higher than the first temperature threshold and no higher than a maximum allowable temperature of the switching elements.

When the limiting has become applied, it is subsequently released when a second temperature condition is detected. The second temperature condition may be specified as that the temperature of the coolant fluid has become less than the first temperature threshold. Alternatively, the second temperature condition may be specified as that the temperature of the coolant fluid has become less than the first temperature threshold and/or that the temperature of the switching elements has become less than the second temperature threshold.

Furthermore, control may be performed such that the limiting can only be applied during a startup interval having a predetermined duration.

Moreover as with the above embodiments, when the control apparatus determines the level of power supplied from the power converter based on a torque command value (i.e., a specified value of demand torque), limiting of the supplied electrical power from the power converter may be determined by limiting the torque command value.

Alternative Embodiments

The following modifications of the above embodiments can be envisaged:

The (relatively low) torque limit value Trqth2 is not necessarily made fixed. For example if the switching frequency of the switching elements of the inverter 20 is increased in accordance with increase of the electrical angular velocity $\omega$ of the rotary machine 10 it would be possible to lower Trqth2 in accordance with increase of $\omega$, since the amount of heat generated by the switching elements SY# per unit of time depends upon the switching frequency.

It would be possible to modify the third embodiment above such as to reduce the startup value Trqth2 in accordance with increase of the temperature of the coolant fluid 40 in the vicinity of the motor-generator 10, as acquired by the MGECU 50 when circulation of the coolant fluid 40 is commenced. Furthermore it would be possible to modify the third embodiment such as to interrupt the supplying of power to the motor-generator 10 for the duration of the startup interval, instead of enabling such power supplying while limiting the maximum level of the supplied power.

The invention is not necessarily confined to applying limiting to the torque command value Trq* as the parameter which is controlled, and it would be equally possible to apply limiting of currents that flow in the switching elements. Designating the actual values of the d-axis and q-axis current components as id and iq respectively, command values of id and iq may be set as id* and iq*, based upon the torque command value Trq*. A known type of current feedback control can be utilized for maintaining id and iq at the command values id* and iq* respectively. In that case, the guard processing can be implemented by restricting id* and iq* to respective limit (maximum) values.

The invention is not necessarily confined to using the temperature values of the electrical apparatus coolant fluid 40 that are acquired from the temperature sensor 54. In the case of a vehicle equipped with an internal combustion engine together with a rotary machine, it is possible to acquire such temperature information for example based on the engine temperature, as expressed by the temperature of the engine coolant fluid which flows in a path within the cylinder block of the engine, i.e., a flow path which is different from that of the electrical apparatus coolant fluid 40. This is based on the fact that the assignees of the present invention have found, by investigation, a correlation between the temperature of the engine coolant fluid and the temperature of the electrical apparatus coolant fluid.

Furthermore the invention is not necessarily limited to using a single type of information for acquiring the temperature of the electrical apparatus coolant fluid 40, and it would be equally possible to use a combination of a plurality of types of information for that purpose, if available.

It would be further possible to modify the cooling apparatus as follows:

(A) The inverter 20 could be disposed upstream from the motor-generator 10, in the flow path of the coolant fluid 40.

(B) The intercooler 44 could be omitted.

(C) The coolant fluid 40 could be utilized for additional cooling purposes, e.g., a single coolant fluid might be utilized for cooling the engine 16 and for cooling the motor-generator 10 and the inverter 20 in common.

The invention is not limited to the method utilized by the first embodiment above for setting the first temperature threshold T$\alpha$. For example, if there is a fixed deviation of the output characteristic of the temperature sensor 54, this may be sufficiently large that the resultant errors in the detection values from the temperature sensor 54 cannot be ignored. In such a case, it would be possible to take that fixed deviation into account when setting the value of the first temperature threshold T$\alpha$.

Furthermore with the first and second embodiments described above, it is possible that under abnormal circumstances, the torque guard value may become set to the lower-than-normal value (Trqth2) even after a substantial time has elapsed since the coolant fluid circulation was commenced. This might occur when the vehicle is being operated in an abnormally high-temperature environment for example. For that reason, It would be possible to predetermine two different values for the temperature threshold T$\alpha$ of the coolant fluid, i.e., a value of T$\alpha$ which is applied in the temperature comparison operations (steps S12, S16, S16a of FIGS. 2, 4) during a startup interval of predetermined duration which commences when the coolant fluid circulation is commenced, and a value of T$\alpha$ which is applied at other times.

The invention is not limited to using a temperature sensing diode SD for temperature detection. If there are problems due to variations of the individual characteristics of such diodes, then it would be possible to use other types of device such as a thermistor.

It would be equally possible to provide a voltage step-up converter for increasing the voltage from the high-voltage battery 30, and to supply the resultant boosted voltage to the inverter 20. In that case, the voltage conversion circuit would consist of the inverter 20 together with the voltage step-up converter, or the inverter 20. Alternatively, the inverter 20 might be replaced by a suitable voltage step-up converter.

The invention is not limited to the use of IGBTs as the switching elements, and would be equally applicable to a system employing MOS FETs, for example.

The invention is not limited to the use of an IPMSM as the rotary machine. Furthermore the invention is not limited to the use of a synchronous type of rotary machine, and would be equally applicable to induction motors, for example.

The invention has been described above for application to a parallel hybrid type of vehicle, however it would be equally applicable to a series-parallel hybrid type of vehicle.

Furthermore the invention is not limited in application to a vehicle having both a rotary machine and an internal combustion engine as respective drive motors. The invention would be equally applicable to a vehicle equipped only with a rotary machine as the drive motor, such as a series hybrid vehicle, or an electric vehicle having an installed battery used as an energy source for a rotary machine that is operable as the drive motor of the vehicle.

In such a case, when torque limiting is executed during normal running of the vehicle, the total amount of motive power available for driving the vehicle will be correspondingly limited. There is thus a danger that the driveability of the vehicle will be lowered and that the user will experience unease. For that reason it would be preferable for the control system of such a vehicle to perform processing whereby the user is notified when torque limiting is being applied. Such processing could consist for example of inputting a signal from the MGECU 50 to the HVECU 60, indicating that torque limiting is being applied, with processing thereby being executed by the HVECU 60 for notifying the vehicle driver accordingly, e.g., by visual indication on the instrument panel, etc.

Thus the invention is not limited to the described embodiments, and various modifications or alternative forms of the embodiments may be envisaged which fall within the scope claimed for the invention, as set out in the appended claims.

What is claimed is:

1. A control apparatus for controlling each of a power converter and a cooling apparatus, the power converter comprising a plurality of switching elements and being electrically connected to a rotary machine, the rotary machine operating as a drive motor of a vehicle when supplied with electrical power from the power converter, the cooling apparatus operating to circulate a coolant fluid via a circulation path extending through the power converter and the rotary machine, and configured to acquire a temperature value of the switching elements, wherein the control apparatus is configured to acquire a temperature value of the coolant fluid, and comprises processing circuitry configured for:

executing a first comparison operation, to compare the acquired temperature value of the coolant fluid with a first temperature threshold;

executing a second comparison operation, to compare the acquired temperature of the switching elements with a second temperature threshold, the second temperature threshold being higher than the first temperature threshold and no higher than a maximum allowable temperature of the switching elements; and selectively executing processing for limiting a maximum value of electrical power supplied to the rotary machine from the power converter and processing for releasing the limiting, the selection being performed based upon results of the first comparison operation and the second comparison operation.

2. The control apparatus as claimed in claim 1, wherein the processing for limiting the maximum value of electrical power supplied to the rotary machine is executed in response to a condition whereby the acquired temperature value of the coolant fluid is judged to exceed the first temperature threshold while also the acquired temperature value of the switching elements is judged to exceed the second temperature threshold.

3. The control apparatus as claimed in claim 1, wherein processing for releasing the limiting of the maximum value of electrical power supplied to the rotary machine from the power converter is executed when the acquired temperature value of the coolant fluid is judged to be no higher than the first temperature threshold, irrespective of the acquired temperature of the switching elements.

4. The control apparatus as claimed in claim 1, wherein the processing circuitry executes processing whereby the limiting of the maximum value of supplied electrical power is inhibited under a condition that the acquired temperature value of the coolant fluid is judged to not exceed the first temperature threshold and the limiting of the maximum value of supplied electrical power is not currently being applied.

5. The control apparatus as claimed in claim 1, wherein while the limiting of the maximum value of supplied electrical power to a first limit value is being applied, the processing circuitry is responsive to at least one of a first condition whereby the temperature of the coolant fluid is judged be no higher than the first temperature threshold and a second condition whereby the temperature of the switching elements is judged to be no higher than the second temperature threshold, for executing processing to release the limiting of the maximum value of electrical power.

6. The control apparatus as claimed in claim 1, wherein the processing circuitry comprises startup interval limiting circuitry configured for executing processing whereby:

the limiting of the maximum value of supplied electrical power is commenced from the start of a fixed-duration startup interval, is terminated when at least one of a first condition and a second condition is detected, and is otherwise terminated at the end of the startup interval, the start of the startup interval coinciding with a commencement of the circulation of the coolant fluid;

the first condition being that the acquired temperature value of the coolant fluid is judged be no higher than the first temperature threshold and the second condition being that the acquired temperature value of the switching elements is judged to be no higher than the second temperature threshold.

7. The control apparatus as claimed in claim 1, wherein the processing circuitry is configured to limit the maximum value of electrical power supplied to the rotary machine to a first limit value in response to a first combination of the results of the first comparison operation and the second comparison operation, and to a second limit value in response to a second combination of the results of the first comparison operation and the second comparison operation, the second limit value being higher than the first limit value.

8. The control apparatus as claimed in claim 7, wherein the processing circuitry is configured to limit the maximum value of electrical power supplied to the rotary machine to the second limit value when the limiting to the first limit value is released.

9. A control apparatus for controlling each of a power converter and a cooling apparatus, the power converter comprising a plurality of switching elements and being electrically connected to a synchronous rotary machine, the rotary machine operating as a synchronous electric motor for driving a vehicle when supplied with a polyphase AC voltage from the power converter, the cooling apparatus operating to circulate a coolant fluid via a circulation path through each of the rotary machine the power converter, the control apparatus being configured to acquire respective temperature values of the rotary machine and of the power converter and to determine a value of electrical power supplied to the rotary machine from the power converter in accordance with a command value of torque;

wherein the cooling apparatus comprises processing circuitry configured for:

executing a first comparison operation, to compare the acquired temperature value (Tc) of the coolant fluid with a first temperature threshold (Tα);

executing a second comparison operation, to compare the acquired temperature value (Tsw) of the switching elements with a second temperature threshold (Tβ), the second temperature threshold being predetermined as higher than the first temperature threshold and no higher than a maximum allowable temperature value (Tγ) of the switching elements;

executing a first judgement operation to judge when a first temperature condition is occurring whereby the acquired temperature value of the coolant fluid exceeds the first temperature threshold while the acquired temperature of the switching elements exceeds the second temperature threshold, when the first temperature condition is judged to occur, executing processing to restrict the torque command value to a first limit value;

executing a second judgement operation for judging when a second temperature condition is occurring whereby the acquired temperature value of the coolant fluid does not exceed the first temperature threshold (Tα) and the torque command value is being restricted to the first limit value, and when the second condition is judged to occur, executing processing for restricting the torque command value to a second limit value which is higher than the first limit value.

10. The control apparatus as claimed in claim 9, wherein the second judgement operation is further executed for judging when a third temperature condition is occurring whereby the acquired temperature of the switching elements exceeds the second temperature threshold and the torque command value is being restricted to the first limit value, and when it is judged that at least one of the second temperature and the third temperatures condition is occurring, processing is executed for restricting the torque command value to the second limit value which is higher than the first limit value.

11. The control apparatus as claimed in claim 9, wherein:
execution of the processing to restrict the torque command value to the first limit value is commenced from the start of a fixed-duration startup interval;

the processing for restricting the torque command value to the second limit value is executed when at least one of a first condition and a second condition is detected, and is otherwise executed at the end of the startup interval, the start of the startup interval coinciding with a commencement of the circulation of the coolant fluid;

the first condition being that the acquired temperature value of the coolant fluid is judged be no higher than the first temperature threshold and the second condition being that the acquired temperature value of the switching elements is judged to be no higher than the second temperature threshold.

12. A control program stored in a memory of a computer in a control apparatus, to be executed by the computer for implementing respective functions of the control apparatus to control each of a power converter and a cooling apparatus, the power converter comprising a plurality of switching elements and being connected to a rotary machine, the rotary machine operating as a drive motor of a vehicle when supplied with polyphase AC power from the power converter, the cooling apparatus operating to circulate a coolant fluid via a circulation path extending through the power converter and the rotary machine, the control apparatus configured for acquiring respective temperature values of the coolant fluid and of the switching elements;

wherein the functions of the control apparatus comprise:
a first judgement operation, for judging when a maximum value of electrical power supplied from the power converter is currently restricted to a first limit value;

a second judgement operation, executed when the maximum value of electrical power is judged to be currently limited to the first limit value, for judging when the acquired temperature value of the coolant fluid exceeds a first temperature threshold (Tα);

a first limiting operation, executed when it is judged that the acquired temperature value of the coolant fluid does not exceed the first temperature threshold, for restricting the maximum value of electrical power to a second limit value, higher than the first limit value;

a third judgement operation, executed when it is judged that the maximum value of electrical power is not currently limited to the first limit value, for judging when the acquired temperature value (Tc) of the coolant fluid exceeds the first temperature threshold (Tα) while concurrently the acquired temperature value (Tsw) of the switching elements exceeds a second temperature threshold (Tβ), the second temperature threshold being predetermined as higher than the first temperature threshold and no higher than a maximum allowable temperature threshold (Tγ) of the switching elements; and a second limiting operation, executed when it is judged that the acquired temperature value (Tc) of the coolant fluid exceeds the first temperature threshold (Tα) while concurrently the acquired temperature value (Tsw) of the switching elements exceeds a second temperature threshold (Tβ), for restricting the maximum value of electrical power to the first limit value.

13. The control program as claimed in claim 12, wherein:
the second limiting operation, for restricting the maximum value of electrical power to the first limit value, is commenced from the start of a fixed-duration startup interval;

the first limiting operation, for restricting the maximum value of electrical power to the second limit value, is executed when at least one of a first condition and a second condition is detected, and is otherwise executed at the end of the startup interval, the start of the startup interval coinciding with a commencement of the circulation of the coolant fluid;

the first condition being that the acquired temperature value of the coolant fluid is judged be no higher than the first temperature threshold and the second condition being that the acquired temperature value of the switching elements is judged to be no higher than the second temperature threshold.

14. The control program as claimed in claim 12, wherein:
the second judgement operation is executed for judging when at least one of a first temperature condition and a second temperature condition is occurring while the maximum value of electrical power is limited to the first limit value, the first temperature condition being that the acquired temperature value of the coolant fluid exceeds the first temperature threshold (Tα) and the second temperature condition being that the acquired temperature value (Tsw) of the switching elements exceeds the second temperature threshold (Tβ); and the first limiting operation is executed when it is judged that at least one of the first temperature condition and the second temperature condition is occurring.

15. The control program as claimed in claim 13, wherein execution of the second limiting operation is confined to within a startup interval having a predetermined duration, the startup interval commencing at a time of commencement of the circulation of the coolant fluid.

* * * * *